(12) United States Patent
Suzuki et al.

(10) Patent No.: US 6,776,051 B2
(45) Date of Patent: Aug. 17, 2004

(54) ULTRASONIC TRANSDUCER AND ULTRASONIC FLOWMETER USING SAME

(75) Inventors: Masaaki Suzuki, Osaka (JP); Takashi Hashida, Osaka (JP); Masahiko Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/084,249

(22) Filed: Feb. 28, 2002

(65) Prior Publication Data

US 2002/0124662 A1 Sep. 12, 2002

(30) Foreign Application Priority Data

Feb. 28, 2001 (JP) ........................................ 2001-056051

(51) Int. Cl.⁷ ................................................ G01F 1/66
(52) U.S. Cl. .................................. 73/861.27; 367/152
(58) Field of Search ......................... 73/861.27–861.31; 367/152

(56) References Cited

U.S. PATENT DOCUMENTS

| | | | | |
|---|---|---|---|---|
| 4,523,122 A | * | 6/1985 | Tone et al. ................. | 310/334 |
| 5,437,194 A | * | 8/1995 | Lynnworth ............... | 73/861.27 |

FOREIGN PATENT DOCUMENTS

| | | |
|---|---|---|
| JP | 01-49785 | 11/1990 |
| JP | 02-141194 | 11/1990 |
| JP | 02-141194 U | 11/1990 |

\* cited by examiner

Primary Examiner—Harshad Patel
(74) Attorney, Agent, or Firm—Browdy and Neimark, P.L.L.C.

(57) ABSTRACT

It is an object of the present invention to provide an ultrasonic transducer, which is so configured as to reduce the variations in characteristics, thereby to enable the stabilization of the precision, as well as to enable the improvement of the durability, and the like, a method for manufacturing the ultrasonic transducer, and an ultrasonic flowmeter. In order to attain this object, in accordance with the present invention, the ultrasonic transducer is so configured as to include a piezoelectric element and an acoustic matching layer, wherein the acoustic matching layer is made of a dry gel of an inorganic oxide or an organic polymer, and a solid skeletal part of the dry gel has been rendered hydrophobic. With this configuration, it is possible to obtain the ultrasonic transducer having an acoustic matching layer 3 which is very lightweight and has a small acoustic impedance due to the solid skeletal part of the dry gel which has been rendered hydrophobic. Further, it is also possible to obtain the ultrasonic transducer which shows a narrow range of characteristic variations, and is stable due to the high homogeneity of the dry gel.

25 Claims, 7 Drawing Sheets

Fig. 8

(Step 1) Electrodialyzed silicic acid solution with a pH of 9 to 10

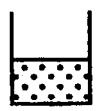

← Adjustmet of pH to 5.5
↓ Coating (dropwise addition)

(Step 2) Merging with a hermetically sealed case 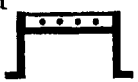

↓ Gelation

The OH group on the case surface and the alkoxy group of the raw material react and are chemically bonded with each other upon gelation.

(Step 3) Wet gel film 

← Hydrophobization treatment
← Solvent exchange to hexane
← Drying at 100 °C or more (Step 4)

Silica dry gel film 

← Formation of a protective film of amorphous carbon (diamond-like carbon) film by high frequency plasma CVD (Step 5) 

(Step 6) Device 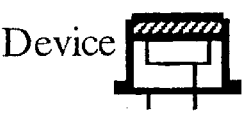

ULTRASONIC TRANSDUCER AND ULTRASONIC FLOWMETER USING SAME

BACKGROUND OF THE INVENTION

1. Field of the Invention

The present invention relates to an ultrasonic transducer for transmitting and receiving ultrasonic waves, and a method for manufacturing the ultrasonic transducer, and an ultrasonic flowmeter using the ultrasonic transducer.

2. Description of Prior Art

In recent years, an ultrasonic flowmeter which measures the time of flight of an ultrasonic wave across the propagation path, and determines the passing speed of a fluid, thereby to measure the flow rate has come into use for a gas meter or the like.

FIG. 1 is a diagram showing the measurement principle of an ultrasonic flowmeter. As shown in FIG. 1, a fluid flows in the direction indicated by an arrow at a velocity V in a tube. A pair of ultrasonic transducers 101 and 102 are oppositely mounted on a tube wall 103. The ultrasonic transducers 101 and 102 are respectively configured with piezoelectric vibrators such as piezoelectric ceramics as electrical energy/mechanical energy conversion elements. Herein, the ultrasonic transducer 101 is used as an ultrasonic transmitter, and the ultrasonic transducer 102 is used as an ultrasonic receiver.

The operation is as follows. Upon application of an alternating voltage with a frequency in the vicinity of the resonance frequency of the ultrasonic transducer 101 to the piezoelectric vibrator, the ultrasonic transducer 101 emits an ultrasonic wave into an external fluid along a propagation path denoted by L1 in the diagram. Then, the ultrasonic transducer 102 receives the propagated ultrasonic wave, and converts it into a voltage. Subsequently, the ultrasonic transducer 102 is used as an ultrasonic transmitter, and the ultrasonic transducer 101 is used as an ultrasonic receiver. Upon application of an alternating voltage with a frequency in the vicinity of the resonance frequency of the ultrasonic transducer 102 to the piezoelectric vibrator, the ultrasonic transducer 102 emits an ultrasonic wave into the external fluid along a propagation path denoted by L2 in the diagram. Then, the ultrasonic transducer 101 receives the propagated ultrasonic wave, and converts it into a voltage.

Further, with such an ultrasonic transducer, if an alternating voltage is successively applied thereto, ultrasonic waves are successively emitted from the ultrasonic transducer. Accordingly, it becomes difficult to determine the time of flight. For this reason, in general, a burst voltage signal using a pulse signal as a carrier wave is used as a driving voltage. Hereinafter, the measurement principle will be described in more details. Upon application of a burst voltage signal for driving to the ultrasonic transducer 101, an ultrasonic pulse wave is emitted from the ultrasonic transducer 101. The ultrasonic pulse wave propagates through the propagation path L1 with a length L, and reaches the ultrasonic transducer 102 after (time of flight) t hours. With the ultrasonic transducer 102, the propagated ultrasonic pulse wave can be converted into an electrical pulse wave at a high S/N ratio. By using the electrical pulse wave as a trigger signal, the ultrasonic transducer 101 is driven again to emit an ultrasonic pulse wave. This device is referred to as a sing-around device. The time required for an ultrasonic pulse to be emitted from the ultrasonic transducer 101, and propagate through the propagation path to reach the ultrasonic transducer 102 is referred to as a sing-around period. The inverse thereof is referred to as a sing-around frequency.

In FIG. 1, a reference character V denotes the flow velocity of the fluid flowing in the pipe, C denotes the velocity of an ultrasonic wave in the fluid, and θ denotes the angle between the direction of flow of the fluid and the direction of propagation of an ultrasonic pulse. When the ultrasonic transducer 101 is used as a transmitter, and the ultrasonic transducer 102 is used as a receiver, the following equation (1) holds:

$$f1=1/t1=(C+V \cos \theta)/L \tag{1}$$

where t1 denotes the sing-around period which is the time for an ultrasonic pulse emitted from the ultrasonic transducer 101 to reach the ultrasonic transducer 102, and f1 denotes the sing-around frequency.

In contrast, when the ultrasonic transducer 102 is used as a transmitter, and the ultrasonic transducer 101 is used as a receiver, the following equation (2) holds:

$$f2=1/t2=(C-V \cos \theta)/L \tag{2}$$

where t2 denotes the sing-around period therefor, and f2 denotes the sing-around frequency.

Accordingly, the frequency difference Δf between both the sing-around frequencies is expressed as the following equation (3), so that the flow velocity V of the fluid can be determined from the length L of the propagation path for the ultrasonic wave, and the frequency difference Δf:

$$\Delta f = f1 - f2 = 2V \cos \theta / L \tag{3}$$

Namely, it is possible to determine the flow velocity V of the fluid from the length L of the propagation path for the ultrasonic wave, and the frequency difference Δf. Therefore, it is possible to determine the flow rate from the flow velocity V.

Such an ultrasonic flowmeter is required to have a high degree of precision. In order to improve the precision, the acoustic impedance of a matching layer becomes important which is formed on the transmitting and receiving surface of ultrasonic waves in the piezoelectric vibrator configuring the ultrasonic transducer for transmitting ultrasonic waves to a gas, or receiving the ultrasonic waves propagated through the gas. The acoustic impedance of the piezoelectric vibrator for generating the ultrasonic vibrations is about $30 \times 10^6$. The acoustic impedance of air is about 400. The ideal value of the acoustic impedance of the acoustic matching layer is about $0.11 \times 10^6$. Further, the acoustic impedance is defined as the following equation (4):

$$\text{Acoustic impedance} = (\text{density}) \times (\text{sound velocity})$$

Therefore, a low density material, such as a material obtained by solidifying a glass balloon or a plastic balloon with a resin material, is used for the acoustic matching layer for controlling the acoustic impedance at a low level. Alternatively, there has been adopted a method in which a hollow glass ball is thermally compressed, a molten material is foamed, or the like. The method is disclosed in Japanese Patent Publication No. 2559144, or the like.

For the acoustic matching layer used in a conventional ultrasonic transducer used for an ultrasonic flowmeter, there has been adopted a method in which a hollow glass ball is thermally compressed, a molten material is foamed, or the like, as described above. For this reason, there occur the following problems. The medium tends to be heterogeneous due to fracture of the glass ball under pressure, separation under insufficient pressure, foaming of the peeled molten material, or the like. Accordingly, variations occur in characteristics, which then generates variations in device precision. Further, there also occur the following problems. For example, since the acoustic matching layer is exposed to a gas, the surface is collapsed by the moisture, or the layer is easily deteriorated by a chemically active substance, resulting in inferior durability.

SUMMARY OF THE INVENTION

The present invention has been completed for solving such problems. It is an object of the present invention to provide a high sensitivity ultrasonic transducer, which is so configured as to reduce the variations in characteristics, thereby to enable the stabilization of the precision, as well as to enable the improvement of the durability, and the like, a method for manufacturing the ultrasonic transducer, and an ultrasonic flowmeter.

An ultrasonic transducer of the present invention is so configured as to include a piezoelectric element and an acoustic matching layer, wherein the acoustic matching layer is made of a dry gel of an inorganic oxide or an organic polymer, and the solid skeletal part of the dry gel has been rendered hydrophobic. With this configuration, it is possible to obtain the ultrasonic transducer having an acoustic matching layer which has a low acoustic impedance due to the solid skeletal part of the dry gel which has been rendered hydrophobic. Further, the ultrasonic transducer shows a narrow range of characteristic variations due to the high homogeneity of the dry gel.

Further, if the ultrasonic transducer of the present invention is embodied in the following manner, it is possible to obtain more preferred ultrasonic transducers.

First of all, the ultrasonic transducer is so configured that the piezoelectric element and the acoustic matching layer are chemically bonded with each other.

Secondly, the ultrasonic transducer is so configured that the piezoelectric element is mounted on the inner side of a hermetically sealed case, and the acoustic matching layer is mounted on the outer side of the hermetically sealed case opposed to the mounting position of the piezoelectric element.

Thirdly, the ultrasonic transducer is so configured that the hermetically sealed case has an acoustic matching layer mounting part in the form of recess with a depth which is a quarter of the ultrasonic oscillation frequency at the position of the outer side opposed to the mounting position of the piezoelectric element, and the acoustic matching layer mounting part is filled with the dry gel of an inorganic oxide or an organic polymer.

Fourthly, the ultrasonic transducer is so configured that the hermetically sealed case and the acoustic matching layer are chemically bonded with each other.

Fifthly, the ultrasonic transducer is so configured that the hermetically sealed case is made of a conductive material.

Sixthly, the ultrasonic transducer is so configured that the conductive material is a metal material.

Seventhly, the ultrasonic transducer is so configured that the dry gel constituting the acoustic matching layer has a density of 500 kg/m$^3$ or less, and a mean pore diameter of 100 nm or less.

Eighthly, the ultrasonic transducer is so configured that the solid skeletal part of the dry gel contains at least silicon oxide or aluminium oxide as a component.

Ninthly, the ultrasonic transducer is so configured that a protective layer with a density of 800 kg/m$^3$ or more, and a thickness of 10 $\mu$m or less is formed on the surface of the acoustic matching layer.

Tenthly, the ultrasonic transducer is so configured that the protective layer is made of any of a metal material, an inorganic material, and a polymer material.

Eleventhly, the ultrasonic transducer is so configured that the protective layer is made of any of aluminium, silicon oxide, aluminium oxide, amorphous carbon, and polyparaxylene.

In a method for manufacturing an ultrasonic transducer of the present invention, the ultrasonic transducer includes an acoustic matching layer made of a dry gel of an inorganic oxide or an organic polymer, the solid skeletal part of the dry gel having been rendered hydrophobic, and a piezoelectric element. The method includes a step of brazing (or soldering) the dry gel to the piezoelectric element or a gas shielding case on the inner side of which the piezoelectric element is mounted. With the ultrasonic transducer obtained by using this manufacturing method, it is possible to achieve higher sensitivity and stabilization of the characteristics due to the acoustic matching layer with a low acoustic impedance.

In a method for manufacturing an ultrasonic transducer of the present invention, the ultrasonic transducer includes an acoustic matching layer made of a dry gel of an inorganic oxide or an organic polymer, the solid skeletal part of the dry gel having been rendered hydrophobic, and a piezoelectric element. The method includes a step of forming the acoustic matching layer. The acoustic matching layer formation process includes: a deposition step of applying a gel raw material solution to the piezoelectric element or a gas shielding case on the inner side of which the piezoelectric element is mounted; a solidification step of obtaining a wet gel from the gel raw material solution; and a drying step of removing a solvent in the wet gel to obtain a dry gel. With the ultrasonic transducer obtained by using this manufacturing method, it is possible to achieve higher sensitivity and stabilization of the characteristics due to the acoustic matching layer with a low acoustic impedance.

Further, if the method for manufacturing an ultrasonic transducer of the present invention is embodied in the following manner, it is possible to obtain more preferred ultrasonic transducers.

First of all, in the ultrasonic transducer including the piezoelectric element mounted on the inner side of a hermetically sealed case, the hermetically sealed case has an acoustic matching layer mounting part in the form of recess with a depth which is a quarter of the ultrasonic wave length at the position of the outer side opposed to the mounting position of the piezoelectric element of the hermetically sealed case. In the method for manufacturing the ultrasonic transducer, the gel raw material solution is applied to the acoustic matching layer mounting part.

Secondly, in the method for manufacturing the ultrasonic transducer, a protective layer is formed on the surface of the acoustic matching layer by a dry deposition method.

Further, an ultrasonic flowmeter of the present invention includes: a flow rate measuring part through which a fluid to be measured flows; a pair of ultrasonic transducers for transmitting and receiving an ultrasonic wave mounted at the flow rate measuring part; a measuring circuit for measuring the time of flight of an ultrasonic wave between the ultrasonic transducers; and a flow rate operation means for calculating the flow rate based on the signal from the measuring circuit, each of the ultrasonic transducers being made up of a hermetically sealed case by which the fluid to be measured and the piezoelectric element are shielded from each other. With this ultrasonic flowmeter, it is possible to achieve the improvement of the stability of the flow rate measurement due to the high sensitivity and the narrow range of variations in characteristics of the ultrasonic transducers.

As described above, the present invention provides such a configuration that the acoustic matching layer is made of a dry gel of an inorganic oxide or an organic polymer, and the solid skeletal part of the dry gel has been rendered hydrophobic. Accordingly, it is possible to obtain an ultrasonic transducer having an acoustic matching layer which is very lightweight and has a small acoustic impedance due to the solid skeletal part of the dry gel which has been rendered hydrophobic. Further, it is also possible to obtain the ultrasonic transducer which shows a narrow range of characteristic variations, and is stable due to the high homogeneity of the dry gel. Still further, upon formation of the dry gel of an inorganic oxide or an organic polymer, the OH group on the piezoelectric element surface or the case surface and the component of the raw material react and chemically bonded with each other to ensure the bond therebetween. Therefore, such an excellent effect can also be expected that an adhesion layer-free, or a so-called adhesion layer-less ultrasonic transducer is obtainable.

Such objects and advantages of the present invention will become more apparent from the following description of embodiments given by reference to the accompanying drawings.

BRIEF DESCRIPTION OF THE DRAWINGS

FIG. 8 is a flow chart illustrating a third example of a manufacturing method of the ultrasonic transducer of the present invention;

DESCRIPTION OF THE PREFERRED EMBODIMENTS (First Embodiment)

Figure 1:
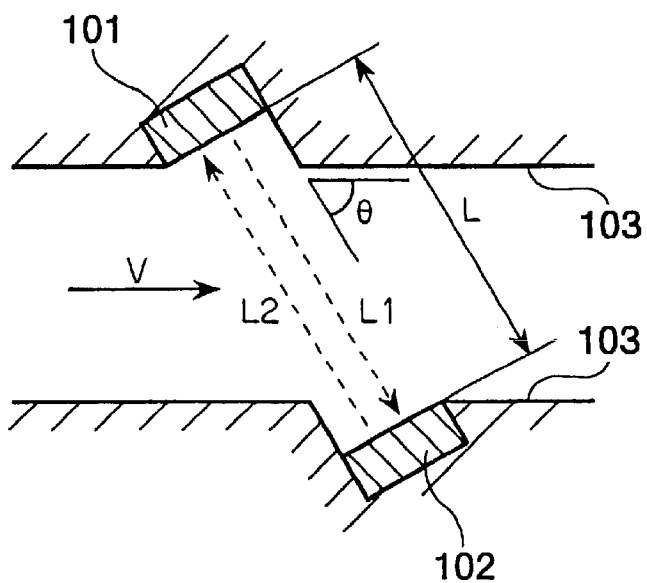
FIG. 1 is a cross sectional view showing the measurement principle of a conventional ultrasonic flowmeter.
Figure 2:
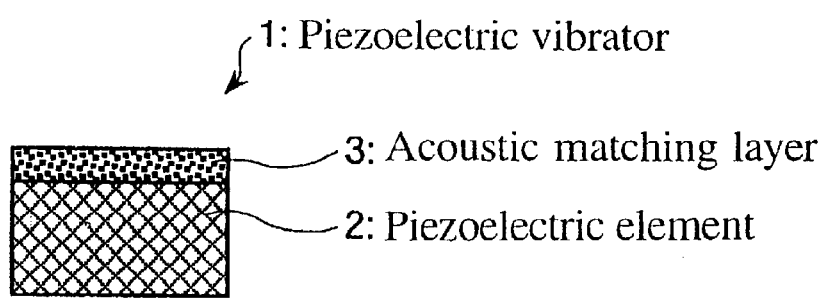
FIG. 2 is a cross sectional view of an ultrasonic transducer shown as a first embodiment of the present invention.

FIG. 2 is a cross sectional diagram of a piezoelectric vibrator of an ultrasonic transducer used for an ultrasonic flowmeter, showing a first embodiment of the present invention. In FIG. 2, a piezoelectric vibrator 1 for performing electric-ultrasonic wave interconversion is made up of a piezoelectric element 2 and an acoustic matching layer 3.

The piezoelectric element 2 generates ultrasonic vibrations. It is made up of piezoelectric ceramics, piezoelectric monocrystals, or the like. It is polarized in the direction of thickness, and it has electrodes on the upper and lower sides. The acoustic matching layer 3 is for transmitting an ultrasonic wave to a gas, or receiving the ultrasonic wave propagated through the gas. The acoustic matching layer 3 has functions of causing the mechanical vibrations of the piezoelectric element 2 excited by a driving alternating voltage to efficiently outgo to the external medium as ultrasonic waves, and efficiently converting the incoming ultrasonic waves into a voltage. It is bonded on one side of the piezoelectric element 2 through a chemical bond so as to form the transmitting and receiving surface of ultrasonic waves in the piezoelectric element 2. Further, the acoustic matching layer 3 is made of a dry gel of an inorganic oxide or an organic polymer. The solid skeletal matrix of the dry gel is rendered hydrophobic. Thus, it is formed as a nanoporous material dry gel (nanoporous dry gel) with a density of 500 kg/m$^3$ or less, and a mean pore diameter of 100 nm or less. It is noted that the solid skeletal part of the dry gel of an inorganic oxide contains at least silicon dioxide (silica) or aluminium oxide (alumina) as a component. Further, the solid skeletal part of the dry gel of an organic polymer can be made of a general thermosetting resin or thermoplastic resin. For example, polyurethane, polyurea, cured phenolic resin, polyacrylamide, methyl polymethacrylate, or the like can be applied thereto.

(Second Embodiment)

Figure 3:
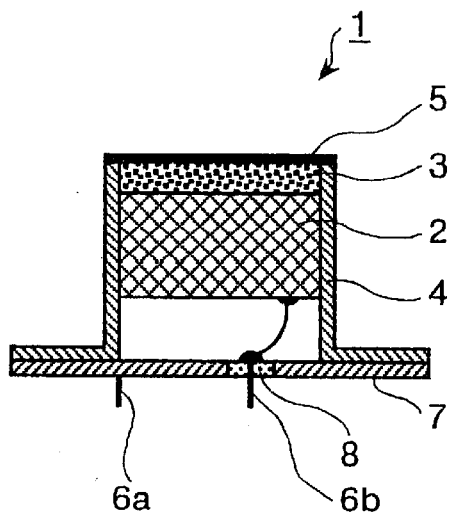
FIG. 3 is a cross sectional view of an ultrasonic transducer shown as a second embodiment of the present invention.

FIG. 3 is a cross sectional diagram of an ultrasonic transducer using the piezoelectric vibrator 1 of FIG. 2, showing a second embodiment of the present invention. Identical numerals and characters are used to designate elements formed with the identical materials and identical functions in FIGS. 2 and 3. A piezoelectric vibrator 1 is bonded to the inside of a case 4 made of a conductive material, for example, made of a material such as a metal capable of ensuring the reliability to the external fluid, generally in tube form. The top opening of the case 4 is covered with a protective layer 5, along with the top of an acoustic matching layer 3 in the piezoelectric vibrator 1. In consequence, the inside thereof is blocked off from the external fluid. In addition, the bottom thereof is covered and completely sealed with a cover plate 7 similarly made of a conductive material such as a metal. As a result, the case 4 is formed as a gas shielding case, together with the cover plate 7. Further, driving terminals 6a and 6b are attached to the cover plate 7. Out of the two driving terminals 6a and 6b, one driving terminal 6a is electrically connected to the top electrode of the piezoelectric element 2 via the cover plate 7 and the case 4. The other driving terminal 6b is electrically insulated by an insulating material 8 from the cover plate 7, and electrically connected to the bottom electrode of the piezoelectric element 2 in the case 4.

The protective layer 5 is a layer with a density of 800 kg/m$^3$ or more, and a thickness of 10 μm or less, and made of a metal material, an inorganic material, a polymer material, or the like. Specifically, other than aluminium, silicon oxide, aluminium oxide, low melting glass, amorphous carbon, polymers (polyparaxylene and polyimide), and the like, coating resins, UV (ultraviolet) curable resins, thermosetting resins, and the like are used. Further, when aluminium is used, it is provided through a vapor deposition or sputtering process. When silicon oxide or aluminium oxide is used, it is provided through a vapor deposition process, a sputtering process, a CVD (Chemical Vapor Deposition) process, or the like. When low melting glass is used, it is provided through a coating process. When an amorphous carbon is used, it is provided through a plasma CVD process. When a polymer (polyparaxylene or polyimide) is used, it is provided through a vapor deposition polymerization process, or the like.

With the ultrasonic transducer thus configured, when a pulse wave voltage having an AC signal component with a frequency in the vicinity of the resonance frequency of the ultrasonic transducer is applied to the driving terminals 6a and 6b, the piezoelectric vibrator 1 vibrates in thickness vibration mode. Accordingly, it emits burst-like ultrasonic waves into a fluid such as a gas or a liquid.

(Third Embodiment)

Figure 4:
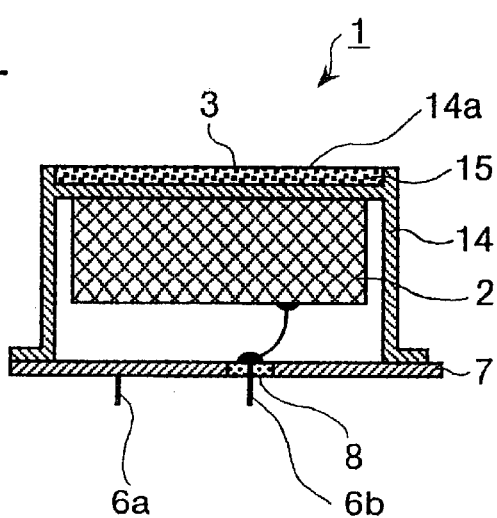
FIG. 4 is a cross sectional view of an ultrasonic transducer shown as a third embodiment of the present invention.

FIG. 4 is a cross sectional diagram of an ultrasonic transducer so configured that a piezoelectric vibrator 1 obtained by slightly modifying the piezoelectric vibrator 1 of FIG. 2 is mounted in a case 14, showing a third embodiment of the present invention. Identical numerals and characters are used in FIGS. 2 to 4 to designate elements formed with the identical materials and identical functions. Therefore, the overlapping description thereof is omitted, and only the different points are described. The case 14 is configured as follows. A recess 15 as an acoustic matching layer mounting part is provided on the top 14a to close the whole of the top 14a, resulting in a generally tube-like case. In addition, the bottom is closed with a cover plate 7, also resulting in a gas shielding case. Incidentally, the depth of the recess 15 is formed with a depth which is a quarter of the ultrasonic oscillation frequency. Further, the case 14 is made of a conductive material, for example, a material such as a metal capable of ensuring the reliability to the external fluid in the same manner as with the case 4 of the first embodiment. The piezoelectric vibrator 1 is so configured that a piezoelectric element 2 is bonded to the top 14a inside the case 14, and an acoustic matching layer 3 is bonded into the external recess 15. Also for the ultrasonic transducer thus configured, when a pulse wave voltage having an AC signal component with a frequency in the vicinity of the resonance frequency of the ultrasonic transducer is applied to the driving terminals 6a and 6b, the piezoelectric vibrator 1 vibrates in thickness vibration mode. Accordingly, it emits burst-like ultrasonic waves into a fluid such as a gas or a liquid.

(Fourth Embodiment)

Figure 5:
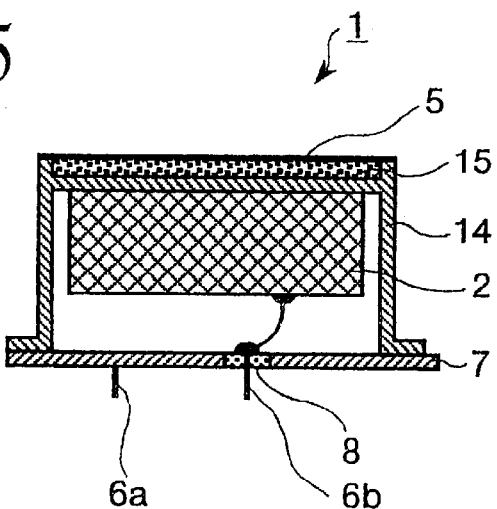
FIG. 5 is a cross sectional view of an ultrasonic transducer shown as a fourth embodiment of the present invention

FIG. 5 shows an ultrasonic transducer of a fourth embodiment of the present invention. The ultrasonic transducer of this embodiment is identical in configuration to the ultrasonic transducer of the third embodiment shown in FIG. 4, except that a protective layer 5 is provided so as to cover the whole top of the acoustic matching layer 3 in the ultrasonic transducer shown in FIG. 4, and the acoustic matching layer 3 is sealed inside the recess 15 serving as an acoustic matching layer mounting part. Also for the ultrasonic transducer thus configured, when a pulse wave voltage having an AC signal component with a frequency in the vicinity of the resonance frequency of the ultrasonic transducer is applied to the driving terminals 6a and 6b, the piezoelectric vibrator 1 vibrates in thickness vibration mode. Accordingly, it emits burst-like ultrasonic waves into a fluid such as a gas or a liquid.

Then, a description will be given to examples of a method for manufacturing each of the acoustic matching layers 3 shown in FIGS. 2 to 5, and bonding it to the piezoelectric element 2 or the case 14.

FIRST EXAMPLE

Figure 6:
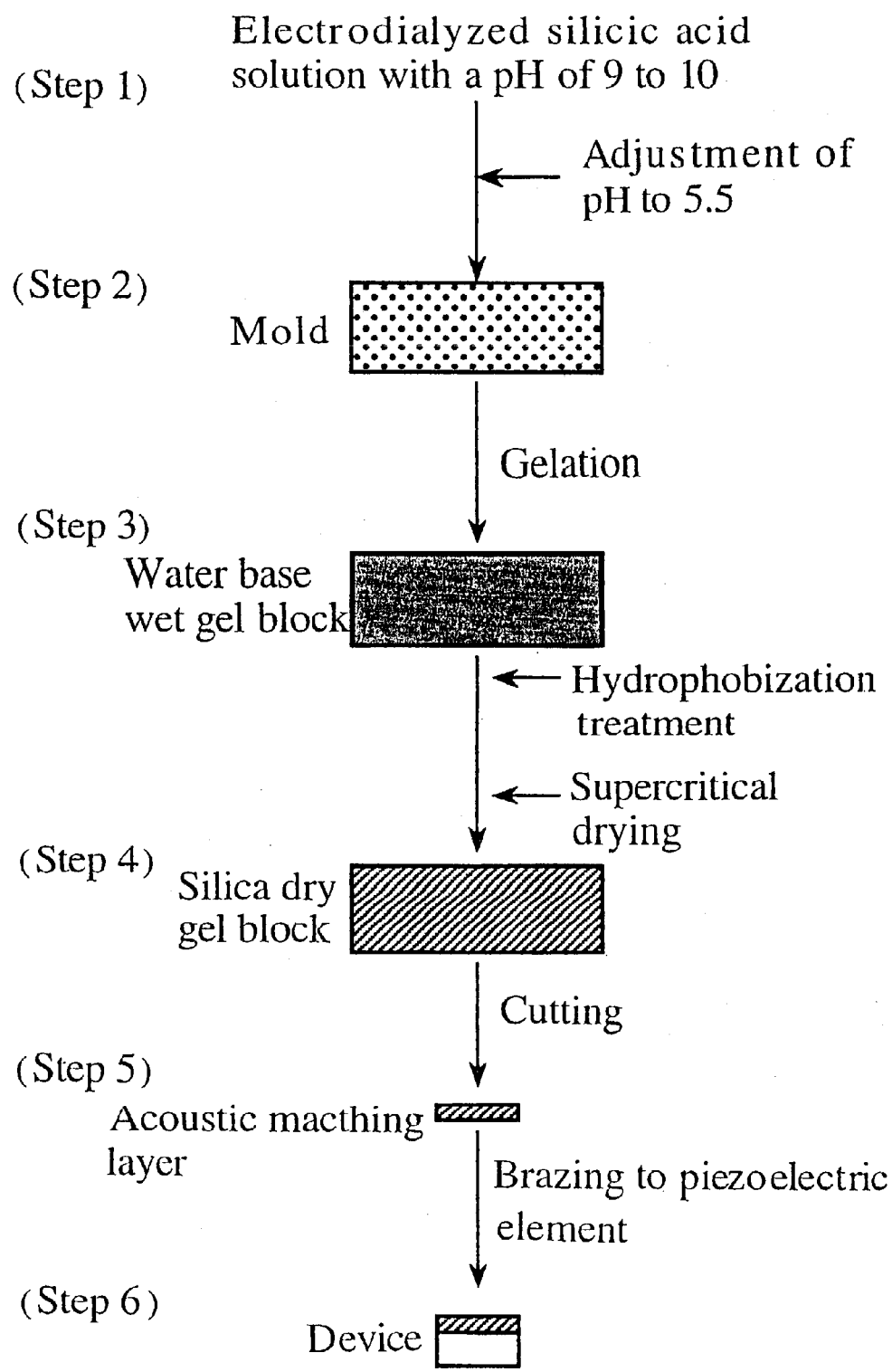
FIG. 6 is a flow chart illustrating a first example of a manufacturing method of the ultrasonic transducer of the present invention.

FIG. 6 is an explanatory diagram illustrating a method for manufacturing the acoustic matching layer 3, and bonding it to the piezoelectric element 2 step by step in accordance with a first example. The first example will be described in the order of steps 1 to 6.

Step 1: electrodialysis of sodium silicate is performed to form a silicic acid solution with a pH of 9 to 10;

Step 2: the silicic acid solution is adjusted to a pH of 5.5, and the resulting solution is poured into a mold. Accordingly, the silicic acid solution gels with time to obtain a water base wet gel block;

Step 3; the gelled silicic acid solution is rendered hydrophobic by an acetone solution of trimethylchlorosilane (TMCS), followed by a dehydration treatment, to form a wet gel block;

Step 4: the wet gel block is subjected to supercritical drying by using carbon dioxide to form a silica dry gel block;

Step 5: the silica dry gel block is cut to a thickness of $\lambda/4$ to form a prescribed acoustic matching layer 3; and Step 6: the acoustic matching layer 3 cut in the step 5 is bonded to one side of the piezoelectric element 2 or the top 14a of the case 14 through silver soldering or an adhesive, resulting in the piezoelectric vibrator 1.

SECOND EXAMPLE

Figure 7:
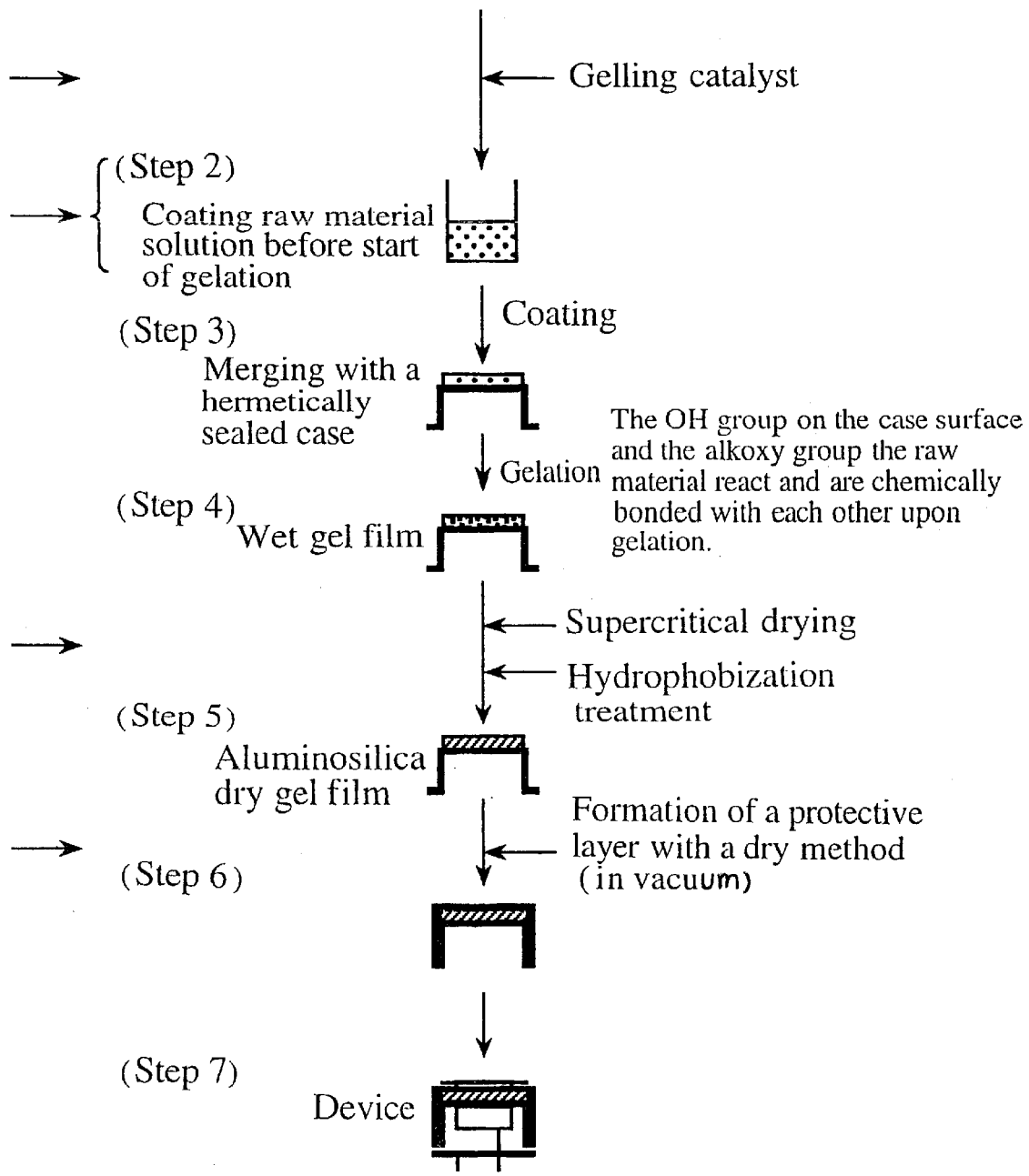
FIG. 7 is a flow chart illustrating a second example of a manufacturing method of the ultrasonic transducer of the present invention.

FIG. 7 is an explanatory diagram illustrating a method for manufacturing the acoustic matching layer 3, and bonding it to the metal sealing type of case 14 step by step in accordance with a second example. The second example will be described in the order of steps 1 to 7.

Step 1: a sol solution is formed from tetraethoxysilane, aluminium-sec-buthoxide, and ethanol;

Step 2: to the resulting sol solution, a gelling catalyst, or an acid or a base is added, to form a coating raw material solution before start of gelation, to be coated in its thickened state to the case 14;

Step 3: the coating raw material solution is coated to the coating surface of the case 14, and merged with the case (hermetically sealed case) 14;

Step 4: when the coating raw material solution is allowed to gel after coating, the OH group on the surface of the case 14 and the alkoxy group of the raw material react and are chemically bonded with each other to form a wet gel film on the surface of the case 14;

Step 5: the film is washed with ethanol. After washing, the film is supercritically dried. Subsequently, it is subjected to a hydrophobization treatment with the vapor of trimethylchlorosilane to form an aluminosilica dry gel film on the surface of the case 14;

Step 6: On the aluminosilica dry gel film formed on the surface of the case 14, a dry protective film (protective layer 5) is formed in vacuum. The protective film 5 is formed by vapor deposition, sputtering, CVD, or the like of silicon dioxide; and Step 7: thereafter, to the case 14, the piezoelectric element 2, the cover plate 7, the driving terminals 6a and 6b, and the like are mounted, resulting in the piezoelectric vibrator 1.

THIRD EXAMPLE

FIG. 8 is an explanatory diagram illustrating a method for manufacturing the acoustic matching layer 3, and bonding it to the metal sealing type of case 14, particularly, when the case 14 is a case made of stainless steel, bonding the acoustic matching layer 3 to the case 14, step by step in accordance with a third example. The third example will be described in the order of steps 1 to 6.

Step 1: electrodialysis of sodium silicate is performed to form a silicic acid solution with a pH of 9 to 10;

Step 2: the silicic acid solution is adjusted to a pH of 5.5, and the resulting solution is added dropwise onto the case 14 for merging between the silicic acid solution and the case 14;

Step 3: when the coating raw material solution is allowed to gel after coating of the coating raw material solution, the OH group on the surface of the case 14 and the alkoxy group of the raw material react and are chemically bonded with each other to form a wet gel film on the surface of the case 14;

Step 4: the gelled silicic acid solution is rendered hydrophobic by an acetone solution of trimethylchlorosilane (TMCS), followed by a dehydration treatment. Further, after solvent exchange to hexane, the solution is dried in a case held at 100° C. to form a silica dry gel film of silicon dioxide;

Step 5: on the silica dry gel film formed on the surface of the case 14, a protective film (protective layer 5) of amorphous carbon (diamond-like carbon) film is formed by high frequency plasma CVD. The protective film 5 is hard, and resistant to scratch, and has a high chemical resistance. Further, it is excellent in gas barrier property, and it has a low sorption ability, and is less likely to sorb chemical substances; and Step 6: thereafter, to the case 14, the piezoelectric element 2, the cover plate 7, the driving terminals 6a and 6b, and the like are mounted, resulting in the piezoelectric vibrator 1.

FOURTH EXAMPLE

Figure 9:
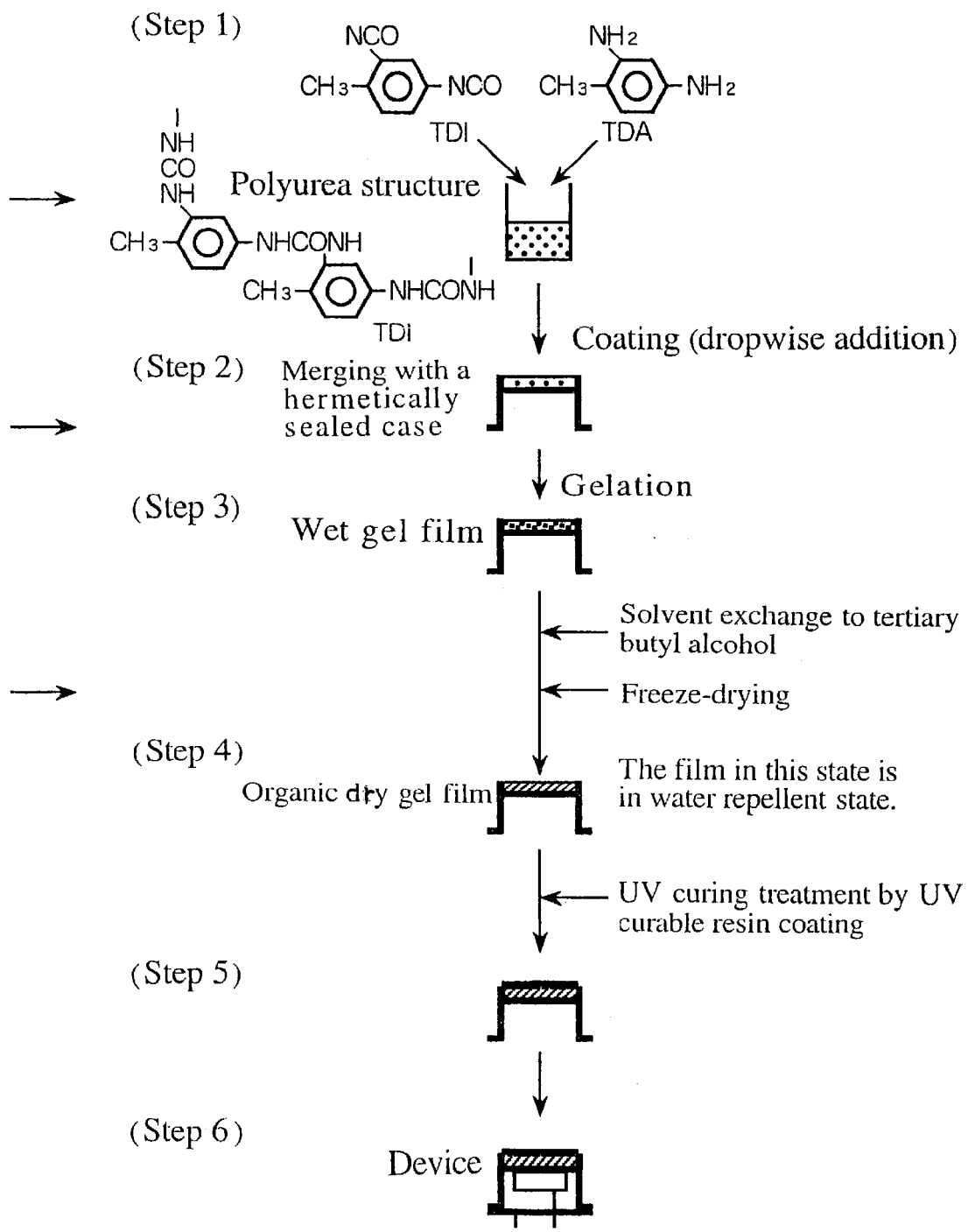
FIG. 9 is a flow chart illustrating a fourth example of a manufacturing method of the ultrasonic transducer of the present invention.

FIG. 9 is an explanatory diagram illustrating a method for manufacturing the acoustic matching layer 3, and bonding it to the case 14 of metal sealing type, particularly, when the case 14 is a case made of aluminium, bonding the acoustic matching layer 3 to the case 14, step by step in accordance with a fourth example. The fourth example will be described in the order of steps 1 to 7.

Step 1: tolylene diisocyanate (TDI) and toluene diamine (TDA) are mixed in an aprotic solvent such as acetone or tetrahydrofuran to form an aqueous solution having a polyurea structure. It is important that a solvent which will not react with the raw material is prepared as the solvent in this step;

Step 2: the resulting aqueous solution is added dropwise onto the case 14 to be merged with the case 14;

Step 3: when the coating raw material solution is allowed to gel after coating of the coating raw material solution, the OH group on the surface of the case 14 and the alkoxy group of the raw material react and are chemically bonded with each other to form a wet gel film on the surface of the case 14;

Step 4: the gelled coating raw material solution is subjected to solvent exchange to tertiary butyl alcohol, and then frozen at 25° C. or less. Subsequently, the frozen solution is heated and dried under reduced pressure of 41 Torr or less to form an organic dry gel film. The resulting organic dry gel film has water repellency;

Step 5: on the organic dry gel film formed on the surface of the case 14, an urethane-based ultraviolet (UV) curable resin is coated, and cured to form a protective film (protective layer 5); and Step 6: thereafter, to the case 14, the piezoelectric element 2, the cover plate 7, the driving terminals 6a and 6b, and the like are mounted, resulting in the piezoelectric vibrator 1.

Figure 10:
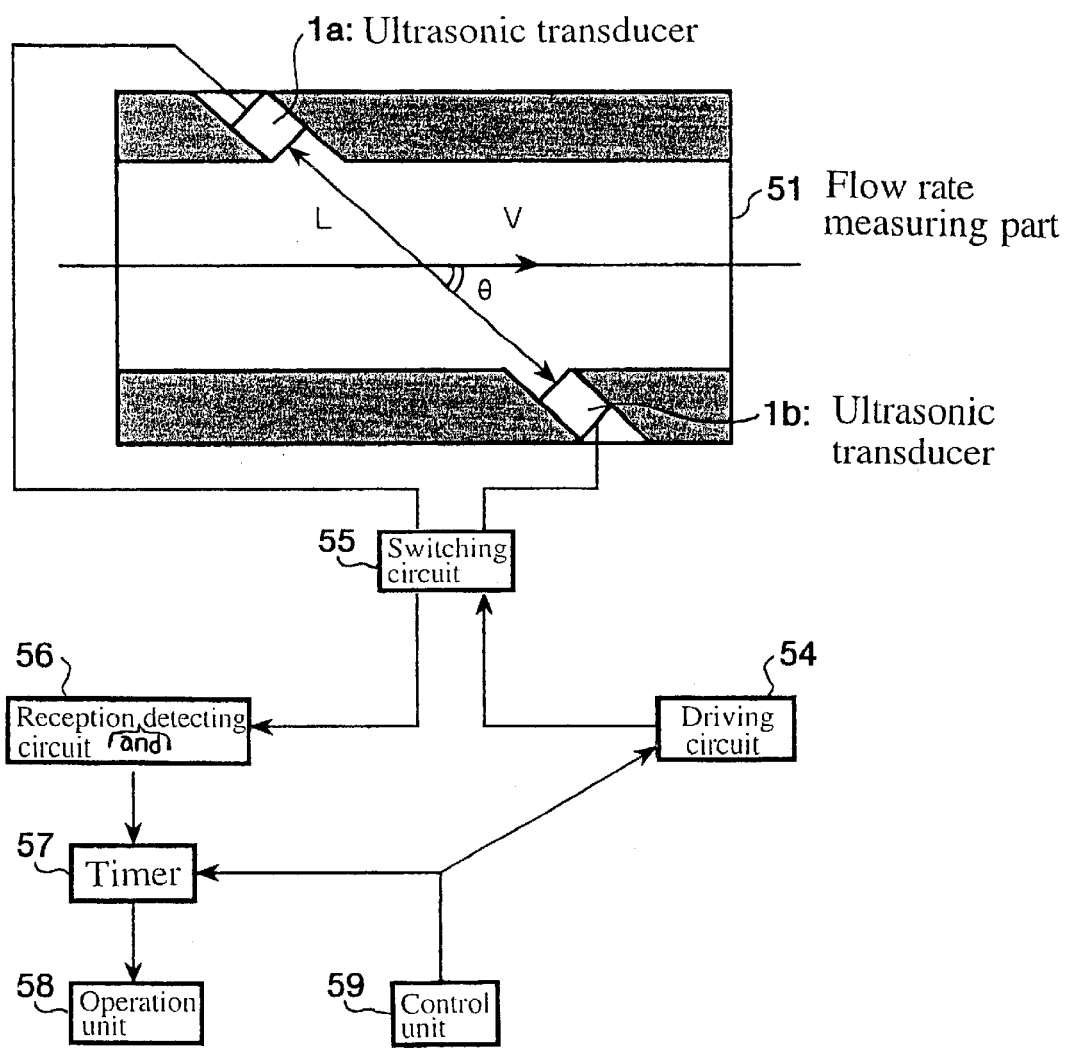
FIG. 10 is a block diagram showing an ultrasonic flowmeter using the ultrasonic transducer of the present invention.

FIG. 10 is a block diagram showing an ultrasonic flowmeter using the ultrasonic transducer of the present invention. The ultrasonic flowmeter in FIG. 10 is installed so that a fluid to be measured flows in the direction indicated by an arrow of the figure at a velocity of V in a tube which is a flow rate measuring part 51. On the tube wall of the flow rate measuring part 51, the ultrasonic transducers 1a and 1b of the present invention are oppositely mounted. Herein, the ultrasonic transducer 1a is used as an ultrasonic transmitter (below, referred to as "ultrasonic transmitter 1a"), and the ultrasonic transducer 1b is used as an ultrasonic receiver (below, referred to as "ultrasonic receiver 1b"). Further, to the ultrasonic transmitter 1a and the ultrasonic receiver 1b, there are connected, via a switching circuit 55 for switching between transmission and reception thereof, a driving circuit 54 for driving the ultrasonic transducers 1a and 1b, a reception and detecting circuit 56 for detecting the ultrasonic pulse, a timer 57 for determining the time of flight of the ultrasonic pulse, an operation unit 58 for performing operation on the flow rate based on the output from the timer 57, and a control unit 59 for outputting a control signal to the driving circuit 54 and the timer 57.

The operation of the ultrasonic flowmeter thus configured will now be described below. The fluid to be measured is set to be, for example, a LP gas, and the driving frequency of the ultrasonic transducers 1a and 1b is set to be about 500 kHz. The control unit 59 outputs a transmission start signal to the driving circuit 54, and at the same time, starts the time measurement of the timer 57. The driving circuit 54 receives the transmission start signal, and drives the ultrasonic transducer 1a to transmit an ultrasonic pulse. The transmitted ultrasonic pulse propagates in the flow rate measuring part, and is received at the ultrasonic transducer 1b. The received ultrasonic pulse is converted into an electric signal at the ultrasonic transducer 1b, and outputted to the reception and detecting circuit 56. The reception and detecting circuit 56 determines the reception timing of the reception signal, and stops the timer 57, and the operation unit 58 performs operation on the time of flight t1.

Subsequently, the switching circuit 55 switches between the ultrasonic transducers 1a and 1b connected therethrough to the driving unit 54 and the reception and detecting circuit 56. Then, the control unit 59 again outputs a transmission start signal to the driving circuit 54, and at the same time, starts the time measurement of the timer 57. Contrary to the case of measurement of the time of flight t1, the ultrasonic transducer 1b transmits an ultrasonic pulse, and the ultrasonic transducer 1a receives it, and the operation unit 58 performs operation on the time of flight t2.

Herein, assuming that the distance connecting between the centers of the ultrasonic transducers 1a and 1b is L, the sound velocity of the LP gas in airless conditions is C, the flow velocity in the flow rate measuring part 51 is V, and the angle between the direction of flow of the fluid to be measured and the line connecting between the centers of the ultrasonic transducers 1a and 1b is θ, it is possible to determine the times of flight t1 and t2, respectively. Further, since the distance L is known, it is possible to determine the flow velocity V if the times t1 and t2 are determined. Accordingly, it becomes possible to check the flow rate from the flow velocity V.

Having described the present invention as related to the preferred embodiments shown in the accompanying drawings, it will be obvious to those skilled in the art that changes and modifications may be made with ease to the invention. Such variations are intended to be within the scope of the present invention.

What is claimed is:

1. An ultrasonic transducer comprising:
   a piezoelectric element; and
   an acoustic matching layer bonded on one side of the piezoelectric element;
   wherein the acoustic matching layer is made of a dry gel of an organic polymer, and the dry gel constituting the acoustic matching layer has a density of 500 kg/m$^3$ or less, and a mean pore diameter of 100 nm or less.

2. The ultrasonic transducer according to claim 1, wherein the piezoelectric element and the acoustic matching layer are chemically bonded with each other.

3. The ultrasonic transducer according to claim 2, wherein a protective layer is provided on a top surface of the acoustic matching layer and covers said entire top surface of the acoustic matching layer, and wherein said protective layer has a density of which is 800 kg/m$^3$ or more, and a thickness of 10 $\mu$m or less.

4. The ultrasonic transducer according to claim 3, wherein the protective layer is selected from the group consisting of a metal material, an inorganic material, and a polymer material.

5. The ultrasonic transducer according to claim 4, wherein the protective layer selected from the group consisting of aluminium, silicon oxide, aluminium oxide, amorphous carbon, and polyparaxylene.

6. An ultrasonic transducer comprising:
   a piezoelectric element; and
   an acoustic matching layer bonded on one side of the piezoelectric element;
   wherein the acoustic matching layer is made of a dry gel of an inorganic oxide having a solid part;
   said solid part of the dry gel having been rendered hydrophobic;
   the dry gel constituting the acoustic matching layer having a density of 500 kg/m$^3$ or less, and a mean pore diameter of 100 nm or less; and
   the solid part of the dry gel containing at least silicon oxide or aluminium oxide as a component thereof.

7. The ultrasonic transducer according to claim 6, wherein the piezoelectric element and the acoustic matching layer are chemically bonded with each other.

8. The ultrasonic transducer according to claim 7, wherein a protective layer is provided on a top surface of the acoustic matching layer and covers said entire top surface of the acoustic matching layer, and wherein said protective layer has a density of which is 800 kg/m$^3$ or more, and a thickness of 10 $\mu$m or less.

9. The ultrasonic transducer according to claim 8, wherein the protective layer is selected from the group consisting of a metal material, an inorganic material, and a polymer material.

10. The ultrasonic transducer according to claim 9, wherein the protective layer is selected from the group consisting of aluminium, silicon oxide, aluminium oxide, amorphous carbon, and polyparaxylene.

11. An ultrasonic transducer comprising:
    a cylindrical case having an inside and a bottom, and made of a conductive material;
    a piezoelectric vibrator bonded to the inside of said case;
    a cover plate covering and completely sealing the bottom of the case for providing an air shielding case;
    a piezoelectric vibrator comprising a piezoelectric element positioned separately upward from the cover plate in the air shielding case, and an acoustic matching layer bonded on an upper surface of the piezoelectric element;
    the acoustic matching layer being made of a dry gel of (1) an inorganic oxide or (2) an organic polymer, and the solid part of the dry gel having been rendered hydrophobic.

12. The ultrasonic transducer according to claim 11, wherein
    a top body is provided on a top of the case for completely sealing the top of the case, the top body having a user side;
    a recess provided on the use side of the top body;
    the piezoelectric element being bonded to a lower surface of the top body inside the case;
    the acoustic matching layer being mounted on an upper surface of the top body in the recess, opposite to the piezoelectric element.

13. The ultrasonic transducer according to claim 12, wherein the recess is formed with a depth which is a quarter of the ultrasonic oscillation frequency.

14. The ultrasonic transducer according to claim 12, wherein the top body of the case and the acoustic matching layer mounted on the top body are chemically bonded together.

15. The ultrasonic transducer according to claim 12, wherein the air shielding case is made of a conductive material.

16. The ultrasonic transducer according to claim 15, wherein the conductive material is a metal material.

17. The ultrasonic transducer according to claim 11, wherein a protective layer with density of 800 kg/m$^3$ or more, and a thickness of 10 $\mu$m or less is formed on the surface of the acoustic matching layer.

18. The ultrasonic transducer according to claim 17, wherein the protective layer is selected from the group consisting of a metal material, an inorganic material, and a polymer material.

19. The ultrasonic transducer according to claim 18, wherein the protective layer is selected from the group consisting of aluminium, silicon oxide, aluminium oxide, amorphous carbon, and polyparaxylene.

20. An ultrasonic flowmeter using an ultrasonic transducer including:
    a piezoelectric element; and
    an acoustic matching layer made of a dry gel of an organic polymer, and the dry gel constituting the acoustic matching layer has a density of 500 kg/m$^3$ or less, and a mean pore diameter of 100 nm or less;
    the ultrasonic flowmeter comprising:
    a flow rate measuring part through which a fluid to be measured flows;
    a pair of said ultrasonic transducers for transmitting and receiving an ultrasonic wave mounted at the flow rate measuring part;
    a measuring circuit for measuring the time of flight of an ultrasonic wave between the ultrasonic transducers; and
    flow rate operation means for calculating the flow rate based on a signal from the measuring circuit;
    each of the ultrasonic transducers being made up of an air shielding case by which the fluid to be measured and the piezoelectric element are shielded from each other.

21. The ultrasonic flowmeter according to claim 20, wherein the air shielding case includes;
 a cylindrical case made of a conductive material;
 a cover plate covering and completely sealing the bottom of the case;
 the piezoelectric element being positioned separately upward from the cover plate in the case and the acoustic matching layer being chemically bonded on upper surface of the piezoelectric element.

22. The ultrasonic flowmeter according to claim 21, wherein a top body is provide on a top of the case forcompletely sealing the top of the case;
 a recess is provided on an upper side of the top body;
 the piezoelectric element is bonded to a lower surface of the top body inside the case;
 the acoustic matching layer is mounted on an upper surface of the top body in the recess, opposite to the piezoelectric element.

23. An ultrasonic flowmeter using an ultrasonic transducer including:
 a piezoelectric element; and
 an acoustic matching layer bonded on one side of the piezoelectric element;
 said acoustic matching layer is made of a dry gel of an inorganic oxide, a solid part of the dry gel having been rendered hydrophobic, the dry gel constituting the acoustic matching layer having a density of 500 kg/m$^3$ or less and a mean pore diameter of 100 nm or less, and the solid part of the dry gel containing at least silicon oxide or aluminium oxide as a component;
 the ultrasonic flow meter comprising:
  a flow rate measuring part through which a fluid to be measured flows;
  a pair of said ultrasonic transducers for transmitting and receiving an ultrasonic wave mounted at the flow rate measuring part;
  a measuring circuit for measuring the time of flight of an ultrasonic wave between the ultrasonic transducers; and
  flow rate operation means for calculating the flow rate based on a signal from the measuring circuit;
  each of the ultrasonic transducers being made up of an air shielding case by which the fluid to be measured and the piezoelectric element are shielded from each other.

24. The ultrasonic flowmeter according to claim 23, wherein the air shielding case includes:
 a cylindrical case made of a conductive material;
 a cover plate covering and completely sealing the bottom of the case;
 the piezoelectric element being positioned separately upward from the cover plate in the case and the acoustic matching layer being chemically bonded on upper surface of the piezoelectric element.

25. The ultrasonic flowmeter according to claim 24, wherein a top body is provided on a top of the case for completely sealing the top of the case;
 a recess is provided on the upper side of the top body;
 the piezoelectric element is bonded to a lower surface of the top body inside the case; and
 the acoustic matching layer is mounted on an upper surface of the top body in the recess, opposite to the piezoelectric element.

* * * * *